United States Patent
Hage-Hassan et al.

(10) Patent No.: US 8,998,333 B2
(45) Date of Patent: Apr. 7, 2015

(54) HEADREST OF VEHICLE SEAT AND VEHICLE SEAT PROVIDED WITH HEADREST

(71) Applicant: TS Tech Co., Ltd., Saitama (JP)

(72) Inventors: Souheil Hage-Hassan, Reynoldsburg, OH (US); Eiji Toba, Reynoldsburg, OH (US)

(73) Assignee: TS Tech Co., Ltd., Saitama (JP)

( * ) Notice: Subject to any disclaimer, the term of this patent is extended or adjusted under 35 U.S.C. 154(b) by 159 days.

(21) Appl. No.: 13/731,437

(22) Filed: Dec. 31, 2012

(65) Prior Publication Data

US 2014/0183921 A1 Jul. 3, 2014

(51) Int. Cl.
*A47C 7/38* (2006.01)
*B60N 2/48* (2006.01)
*B60N 2/20* (2006.01)

(52) U.S. Cl.
CPC ... *B60N 2/48* (2013.01); *B60N 2/20* (2013.01)

(58) Field of Classification Search
USPC ........................................ 297/410, 391, 409
See application file for complete search history.

(56) References Cited

U.S. PATENT DOCUMENTS

| | | | |
|---|---|---|---|
| 5,660,441 A * | 8/1997 | Nagayasu et al. | 297/408 |
| 7,325,877 B2 * | 2/2008 | Brockman et al. | 297/408 |
| 8,146,997 B2 * | 4/2012 | Sobieski et al. | 297/404 |
| 2010/0078983 A1 * | 4/2010 | Yetukuri et al. | 297/408 |
| 2011/0187172 A1 * | 8/2011 | Reel et al. | 297/391 |
| 2011/0204686 A1 * | 8/2011 | Lee et al. | 297/216.12 |
| 2012/0104821 A1 * | 5/2012 | Yetukuri et al. | 297/391 |
| 2012/0261967 A1 * | 10/2012 | Ahlbrand et al. | 297/391 |
| 2013/0049428 A1 * | 2/2013 | Reel | 297/391 |
| 2014/0077564 A1 * | 3/2014 | Tachikawa et al. | 297/391 |

FOREIGN PATENT DOCUMENTS

JP 2010-154949 A 7/2010

\* cited by examiner

*Primary Examiner* — David E Allred
(74) *Attorney, Agent, or Firm* — Drinker Biddle & Reath LLP

(57) ABSTRACT

A headrest design described herein improves rigidity and reduces weight of an entire headrest of a vehicle seat. The headrest of the vehicle seat includes a base member attached to an upper part of a seat back, and a reinforcing member attached to the base member. The base member is formed by coupling a front side base member and a back side base member by a coupling member. The reinforcing member includes attachment portions and projection portions having larger width therebetween than that of the attachment portions. The attachment portions are fixed to a front side of a front side base member. The projection portions continue from the attachment portions and protrude to the upper side of the base member.

11 Claims, 7 Drawing Sheets

HEADREST OF VEHICLE SEAT AND VEHICLE SEAT PROVIDED WITH HEADREST

BACKGROUND

Disclosed herein is a headrest installed in an upper part of a seat back of a vehicle seat, and a vehicle seat provided with a headrest.

In general, a vehicle seat is provided with a headrest in an upper part of a seat back in order to support a head part of a seat user.

Recently, various structures in which size of a headrest is increased in order to further enhance a support property of the head part of the seat user are proposed (for example, refer to Japanese Patent Document No. 2010-154949 ("the '949 Document").

As shown in FIG. 7, a headrest 130 described in the '949 Document is inserted and installed into an upper part of a seat back via stays 132 of a headrest main body 131. Upper ends of the stays 132 are coupled by a laterally bridging portion 133. A plate member 135 is coupled to the laterally bridging portion 133 via a rotation portion 134. The plate member 135 includes an oscillation plate portion 136 fixed to the rotation portion 134 and a plate main body portion 137. A pair of reinforcing portions 138 is fixed to the plate main body portion 137 to extend in the longitudinal direction from both right and left ends of this plate main body portion 137. The reinforcing portions 138 are formed by curving linear members in a substantially U-shape.

However, with the structure of the headrest 130 as in the '949 Document, although the support property of the head part of the headrest 130 can be enhanced by attaching the reinforcing portions 138 to the plate main body portion 137, the reinforcing portions 138 are separately attached to both the right and left ends of the plate main body portion 137. Therefore, there is a fear that attachment workability of support parts of the reinforcing portions 138 is lowered, so that the number of parts is increased. Moreover, when the size of the headrest 130 is increased, the size of the linear members for reinforcing this headrest 130 are also increased. Thus, improvement in rigidity of the support parts of the reinforcing portions 138 is desired.

Therefore, the headrest 130 in which rigidity of the entire headrest 130, particularly the rigidity of the support parts of the reinforcing portions 138, is improved, without increasing weight even upon a size increase, is desired.

Regarding the structure of this headrest 130, although the reinforcing portions 138 are attached to the plate main body portion 137, detailed attachment positions are not considered. Therefore, depending on the attachment positions of the reinforcing portions 138, there is a fear that the reinforcing portions interfere with the other attachment parts. Thus, the headrest 130 in which interference by the reinforcing portions 138 with the other parts is suppressed to improve an attachment property is desired.

Further, when the seat back and the headrest 130 are folded toward the front side and the headrest 130 and loads or the like collide with each other, there is a fear that the reinforcing portions 138 do not easily receive a collision with the structure of this headrest 130. Therefore, the headrest 130 in which the reinforcing portions 138 easily receive the collision so that damage to a frame main body portion and damage to a cushion material placed on the upper side of the frame main body portion can be suppressed is desired.

SUMMARY

Various embodiments of the present invention consider the above problems, and an embodiment of the present invention provides a headrest of a vehicle seat capable of improving rigidity and reducing weight of the entire headrest, and a vehicle seat provided with a headrest.

Another embodiment of the present invention provides a headrest of a vehicle seat in which interference by a reinforcing portion with other attachment portions is suppressed to improve an attachment property, and a vehicle seat provided with a headrest.

Further embodiments of the present invention provide a headrest of a vehicle seat in which a frame reinforcing portion receives a collision so that damage to a frame main body portion and damage to a cushion material placed on the upper side of the frame main body portion can be suppressed when a seat back and the headrest are folded toward the front side and the headrest and loads or the like collide with each other, and a vehicle seat provided with a headrest.

The above problems are solved by a headrest of a vehicle seat according to various embodiments of the present invention, including a base member attached to an upper part of a seat back, and a reinforcing member attached to the base member; in which the base member is formed by coupling a front side base member and a back side base member, and the reinforcing member includes attachment portions fixed to the base member, and projection portions continuing from the attachment portions and protruding to the upper side of the base member, the projection portions having larger width therebetween than that of the attachment portions.

In such a way, the reinforcing member includes the attachment portions fixed to the base member, and the projection portions continuing from the attachment portions and protruding to the upper side of the base member, the projection portions having larger width therebetween than that of the attachment portions. Thus, the weight of the headrest can be reduced and the rigidity of the entire headrest can be improved. Since the base member attached to the upper part of the seat back is formed by coupling the front side base member and the back side base member, rigidity of the base member serving as a base part of the headrest can be improved.

Further, the reinforcing member includes the projection portions protruding to the upper side of the base member. Thus, a lower half part of the headrest is attached to the seat back and supported by a stay, and an upper half part of the headrest is supported by the reinforcing member. Therefore, the rigidity of the entire headrest can be improved.

The base member may include a coupling member for coupling the front side base member and the back side base member, and the reinforcing member may be attached to a front side of the front side base member at a different position from the coupling member. With such a configuration, at the time of attaching the coupling member to the front side base member, interference by the reinforcing member can be suppressed so that workability is improved.

The plurality of coupling members may be provided, and the different position from the coupling members may be a region placed between the plurality of coupling members.

With such a configuration, arrangement becomes compact so that the weight can further be reduced.

The region of the front side base member placed surrounded by the plurality of coupling members may be formed as a protruding convex portion, and the attachment portions may be fixed to the convex portion.

In such a way, the attachment portions may be fixed to the convex portion surrounded by the plurality of coupling members. Thus, the attachment portions of the reinforcing member can be fixed to the convex portion having high rigidity, so that rigidity of the attachment portions of the reinforcing member can be improved.

The attachment portions may extend in the up and down direction along the convex portion, and lower ends of the attachment portions may extend around the lower side of the convex portion.

With such a configuration, with effectively utilizing a space of the convex portion of the front side base member, the rigidity of the attachment portions of the reinforcing member can be improved.

The base member may be formed in a reversed U-shape in which upper parts of a pair of leg portions are coupled, and lower ends of the attachment portions may be arranged on extended surfaces of inner side surfaces of the pair of leg portions.

In such a way, the base member is formed in a reversed U-shape in which the upper parts of the pair of leg portions are coupled. Thus, the weight can be reduced. Since the lower ends of the attachment portions are arranged on the extended surfaces of inner side surfaces of the pair of leg portions, inner parts of the leg portions of the front side base member work as a guide to attachment positions of the lower ends of the attachment portions. Thus, the workability is improved.

The reinforcing member may include a linear member.

With such a configuration, an excessive increase in size of the vehicle seat can be suppressed so that the weight can be reduced.

A stay provided in the seat back may be inserted into the base member, and the reinforcing member may be arranged in at least a different region from a region where the stay is inserted in the base member.

With such a configuration, the different region from the region of the base member to be supported by the stay is supported by the reinforcing member so that the rigidity of the entire headrest can be improved.

Width between upper ends or parts in the vicinity of the upper ends may be largest in the projection portions.

With such a configuration, rigidity of the upper side of the headrest can be improved. Moreover, with such a configuration, when the seat back and the headrest are folded toward the front side and the headrest and loads or the like collide with each other, the projection portion having large width of the reinforcing member receive the collision so that the damage to the base member and the damage to the cushion material arranged in the region positioned on the upper side of the base member can be suppressed.

A vehicle seat provided with the headrest of the vehicle seat as described below may be formed.

With such a configuration, the rigidity of the entire headrest can be improved and the vehicle seat whose size is easily increased and whose weight is easily reduced can be obtained.

In the vehicle seat, the seat back and the headrest may be foldable toward the front side.

With such a configuration, when the seat back and the headrest are folded toward the front side and the headrest and loads or the like collide with each other, the reinforcing member placed on the upper side of the base member receives a collision so that damage to the base member and damage to a cushion material arranged in a region positioned on the upper side of the base member can be suppressed.

DETAILED DESCRIPTION

Hereinafter, an embodiment of the present invention will be described with reference to the drawings. Members, arrangement, and the like described below do not limit the present invention but can be variously modified along the gist of the present invention as a matter of course.

The present embodiment of the invention relates to a headrest installed in an upper part of a seat back of a vehicle rear seat.

Figure 1:
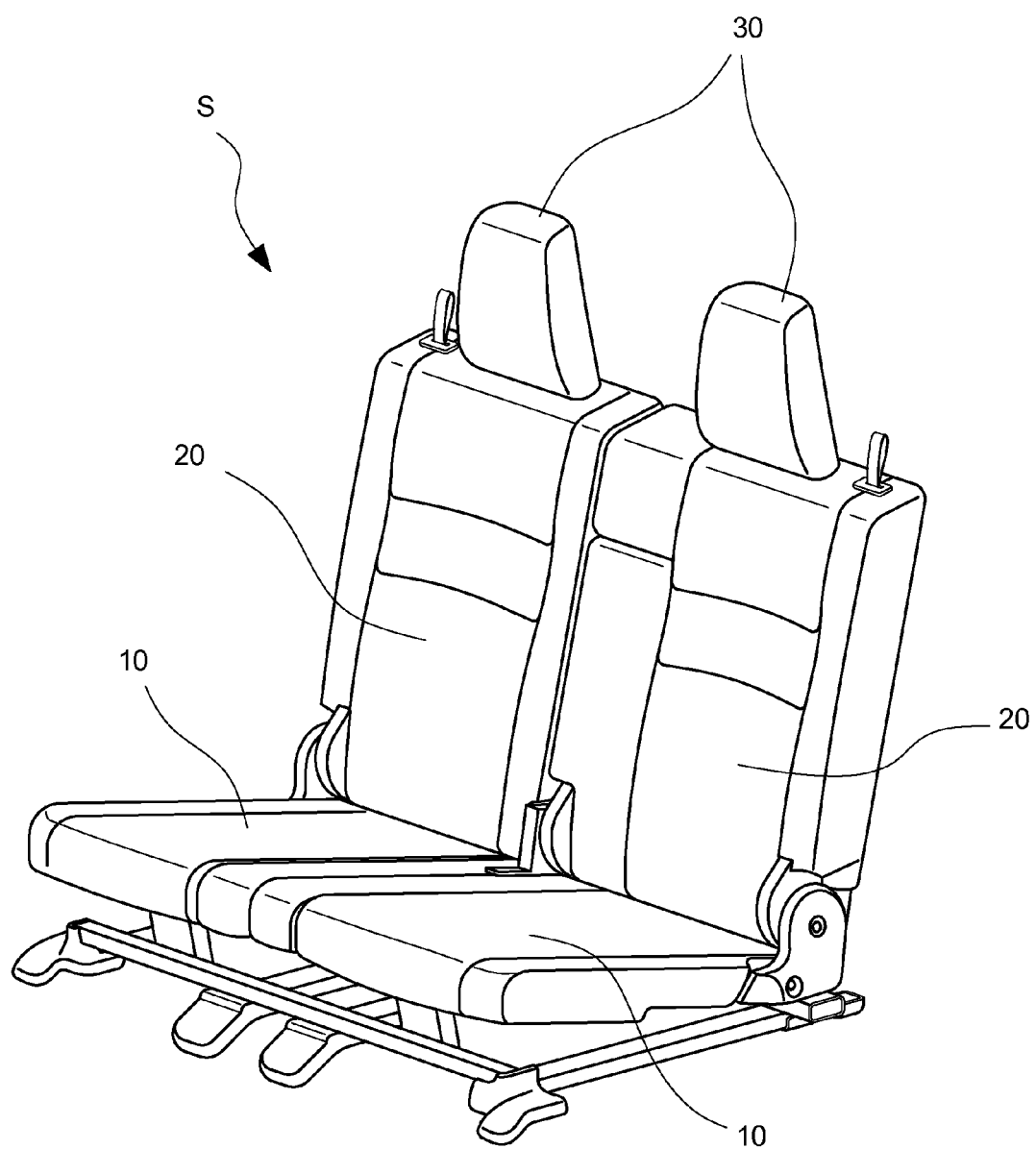
FIG. 1 is a perspective view of a vehicle rear seat using a headrest according to an embodiment of the present invention.

As shown in FIG. 1, a vehicle rear seat S of the present embodiment is mainly formed by a seat cushion 10, a seat back 20, and a headrest 30.

The vehicle rear seat S can be switched from a normal position, where the seat back 20 stands up and a passenger can be seated, to a stowed position, where the seat back 20 is folded forward to overlie the seat cushion 10 so that a loading platform is formed.

Although description will be given based on the headrest of the vehicle rear seat in the present embodiment, the invention is not limited to this but also applicable to a headrest of a vehicle front seat and a vehicle middle seat.

Figure 2:
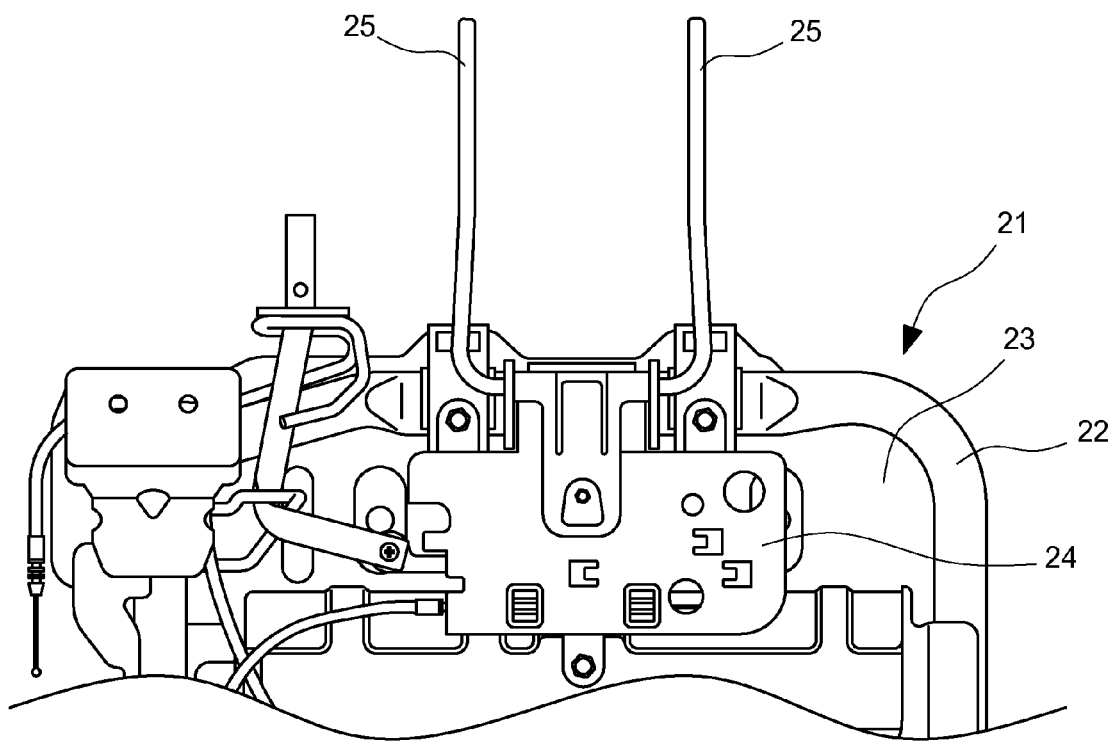
FIG. 2 is a front view of major parts showing a seat back frame of the vehicle rear seat of FIG. 1.

As shown in FIG. 1, the seat back 20 is arranged in the back side of the seat cushion 10 and mainly formed by a seat back frame 21 shown in FIG. 2, a cushion material (not shown) arranged in a front side of this seat back frame 21, and a skin for covering the seat back frame 21 and the cushion material.

As shown in FIG. 2, the seat back frame 21 is mainly formed by a pipe frame 22 and a pan frame 23.

The pipe frame 22 is formed by a metal pipe of a hollow cylindrical body and formed in a substantially rectangular shape. The pan frame 23 is made of known resin and formed in a substantially rectangular plate along an outer form of the seat back 20.

The pan frame 23 is arranged on the rear side of the pipe frame 22 to surround the pipe frame 22 and welded and fixed to the pipe frame 22.

A headrest pivot mechanism 24 and the like are attached to a front side of the pan frame 23.

Figure 3:
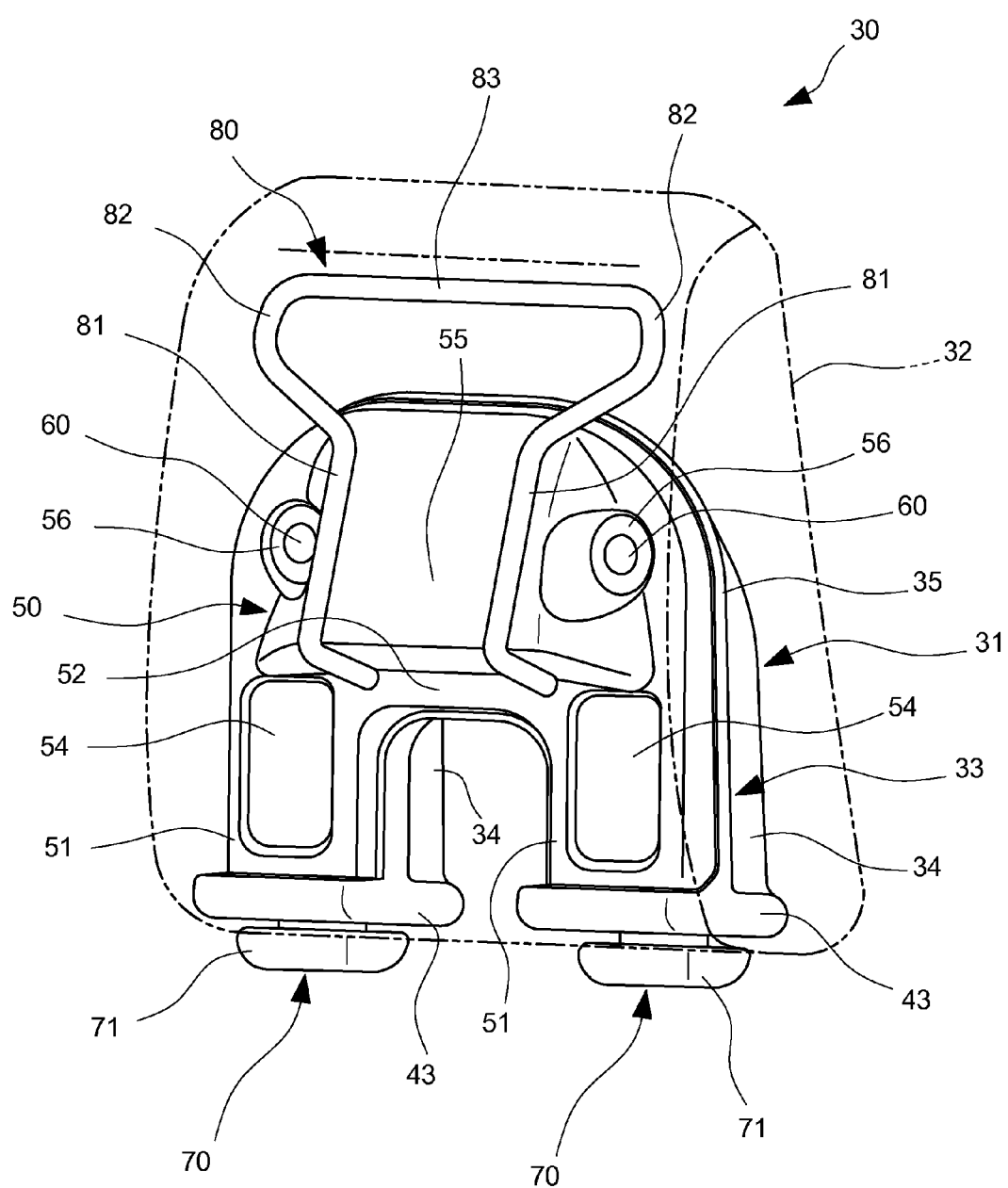
FIG. 3 is a front perspective view showing the headrest according to a first embodiment of the present invention.

The headrest 30 of the present embodiment is provided in an upper part of the seat back 20, and as shown in FIG. 3, mainly formed by a headrest frame 31, a cushion material (not shown) for covering this headrest frame 31, and a skin 32 for covering the headrest frame 31, and the cushion material.

The headrest frame 31 includes a back side base member 33 serving as a base part of the headrest frame 31, a front side base member 50 arranged in a front side of the back side base member 33, stay guides 70 arranged in a bottom surface of the back side base member 33, and a reinforcing member 80 arranged in a front side of the front side base member 50.

The back side base member 33 is formed by a substantially reversed U-shape body made of a known synthetic resin material. As shown in FIG. 3, the back side base member 33 includes a pair of leg portions 34 placed on both the right and left sides, and a combining portion 35 for combining upper parts of the pair of leg portions 34.

Figure 4:
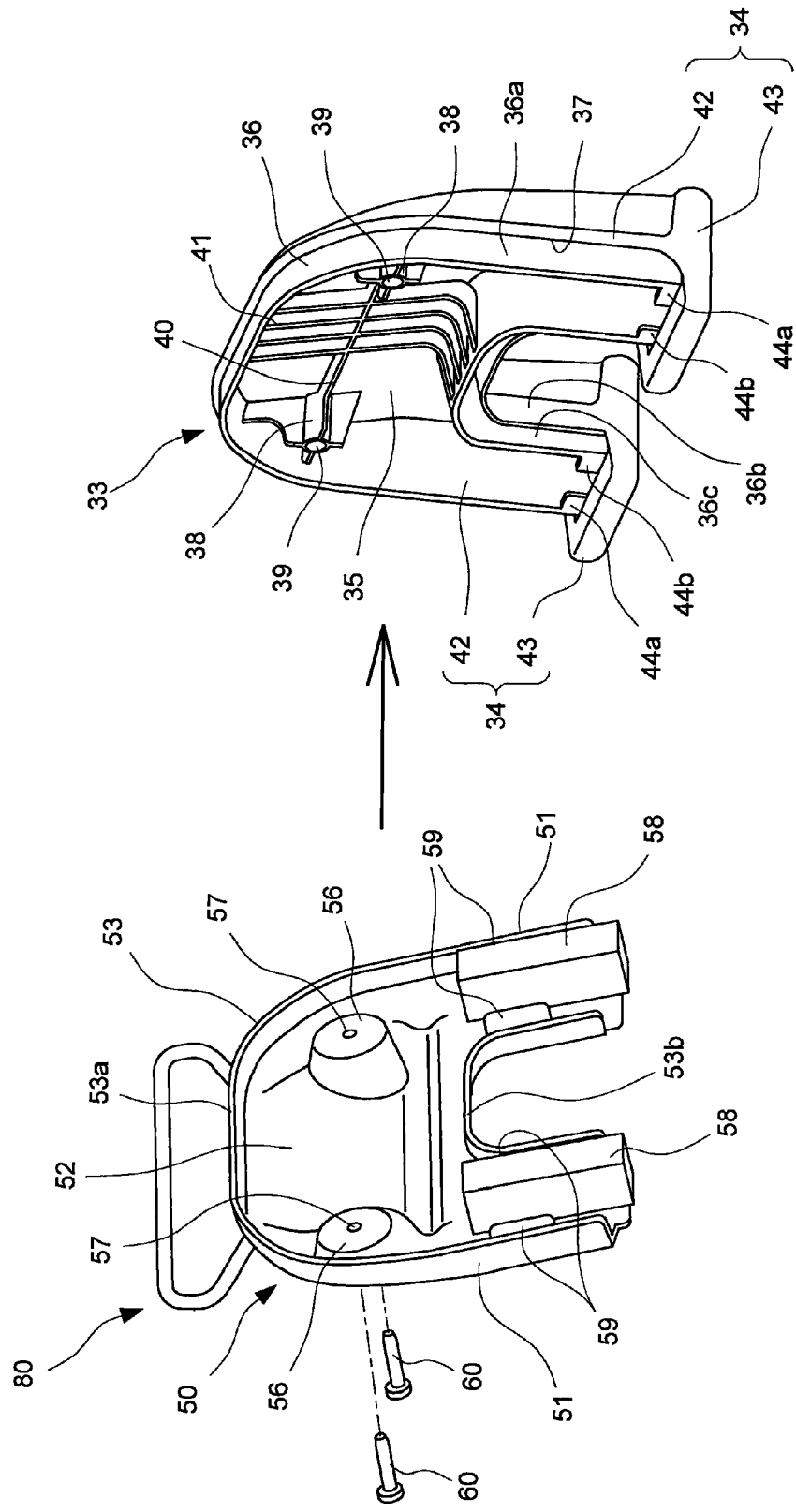
FIG. 4 is an exploded perspective view of the headrest of frame of FIG. 3.

As shown in FIG. 4, a fitting wall portion 36 fitted to the front side base member 50 and an abutment portion 37 serving as a mating surface at the time of fitting to the front side base member 50 are formed on an outer circumference of the back side base member 33.

The fitting wall portion 36 includes a substantially reversed U-shape fitting wall portion 36a including outer parts of the leg portions 34 and an outer part of the combining portion 35, a substantially reversed U-shape fitting wall portion 36b including inner parts of the leg portions 34 and an inner part of the combining portion 35, and a substantially reversed U-shape fitting wall portion 36c formed to leave a slight distance from the fitting wall portion 36b toward the side of the combining portion 35.

The abutment portion 37 protrudes the most in the outer parts of the leg portions 34 and the outer part of the combining portion 35, and is formed in a substantially reversed U-shape.

A pair of substantially circular joint ribs 38 is formed near both right and left ends of a front side of the combining portion 35, and a substantially circular insertion hole 39 is formed in a center of the joint rib 38. The joint ribs 38 are coupled by a coupling rib 40. The coupling rib 40 extends to both the right and left ends to be coupled to the fitting wall portion 36a.

Four orthogonal ribs 41 are formed in a center in the right and left direction of the front side of the combining portion 35 to be orthogonal to the coupling rib 40. Although the four orthogonal ribs 41 are provided in the present embodiment, the present invention is not limited to this, but at least one orthogonal rib is required.

As shown in FIG. 4, the leg portion 34 includes a leg portion main body 42 having a substantially squared U-shape in the horizontal section, and a lower end flange 43 formed by a substantially rectangular hollow body provided on the lower side of the leg portion 34.

A projection wall 44a formed in a narrow flat plate shape protruding from the side of the fitting wall portion 36a toward the side of the fitting wall portion 36b, and a projection wall 44b formed in a narrow flat plate shape protruding from the side of the fitting wall portion 36b toward the side of the fitting wall portion 36a are respectively formed on the lower side of a front side of the leg portion main body 42. The projection walls 44a, 44b are coupled to an upper surface of the lower end flange 43.

The front side base member 50 is formed by a substantially reversed U-shape body made of a known metal material, and as shown in FIG. 3, includes a pair of leg portions 51 placed on both the right and left sides of the front side base member 50, and a combining portion 52 for combining upper parts of the pair of leg portions 51.

As shown in FIG. 4, a fitting wall portion 53 is formed on an outer circumference of the front side base member 50. The fitting wall portion 53 includes a substantially reversed U-shape fitting wall portion 53a including outer parts of the leg portions 51 and an outer part of the combining portion 52, and a substantially reversed U-shape fitting wall portion 53b including inner parts of the leg portions 51 and an inner part of the combining portion 52.

The fitting wall portion 53a is fitted to be positioned on the outer side of the fitting wall portion 36a of the back side base member 33 and abutted with the abutment portion 37. The fitting wall portion 53b is fitted between the fitting wall portion 36b and the fitting wall portion 36c of the back side base member 33.

As shown in FIG. 3, concave portions 54 recessed in a substantially rectangular shape are provided in front sides of the leg portions 51, and a convex portion 55 protruding in a substantially trapezoidal shape and concave portions 56 recessed in a circular shape are provided in a front side of the combining portion 52.

The convex portion 55 is inclined to ascend from the vicinity of both right and left ends toward a center, has a substantially rectangular flat surface in the center, and also has a shape inclined to descend toward the upper side as a whole.

As shown in FIG. 4, the concave portions 56 are formed near both the right and left ends and have substantially circular insertion openings 57 in centers thereof.

As shown in FIG. 4, a holding portion 58 and a pair of securing portions 59 placed on both right and left ends of the holding portion 58 are provided in a back surface of the leg portion 51. The holding portion 58 is formed in a substantially cylinder shape having a square section made by bending a substantially plate shape metal body, and the securing portions 59 are formed by substantially rectangular plate shaped bodies.

Both side surfaces of the holding portion 58 are secured to the securing portions 59 by welding, and a gap, to which the projection walls 44a, 44b of the back side base member 33 are fitted, is formed between a front side of the holding portion 58 and the back side of the leg portion 51.

As shown in FIG. 4, the front side base member 50 is reliably fixed by attaching a coupling member 60 to the insertion hole 39 via the insertion opening 57 after the front side base member 50 is fitted to the front side of the back side base member 33. An attachment screw or the like is used as the coupling member 60.

As shown in FIG. 3, the stay guides 70 are accommodated into the leg portions 34 of the back side base member 33 from the bottom surface side of the lower end flanges 43.

The stay guide 70 is a hollow rod shape body having a substantially rectangular horizontal section, to be accommodated in an internal space formed by the leg portion 34 and the holding portion 58 to be operated freely upward and downward.

When the stay guide 70 is accommodated into a far end of the internal space formed by the leg portion 34 and the holding portion 58, the bottom surface of the lower end flange 43 of the leg portion 34 and an upper surface of a lower end flange 71 of the stay guide 70 are abutted with each other.

The stay guide 70 has a substantially circular hollow hole in a center in the up and down (vertical) direction. A stay 25 formed by a metal rod shown in FIG. 2 is accommodated into this hollow hole from a bottom surface of the lower end flange 71.

In a state where the stays 25 are accommodated in the stay guides 70, the back side base member 33 is supported by the stays 25. As shown in FIG. 2, the stays 25 are pivotally supported on the headrest pivot mechanism 24.

The back side base member 33 is pivotable by the headrest pivot mechanism 24 from a standing state on the upper side of the seat back 20 to a state folded forward about 90°.

The headrest pivot mechanism 24 is a mechanism for folding the headrest 30 forward by pivoting forward the stays 25 serving as support members for coupling the seat back frame 21 and the headrest frame 31.

The back side base member 33 and the front side base member 50 are both formed by a substantially reversed U-shape body, and the fitting wall portion 53 of the front side base member 50 can be coupled along the fitting wall portion 36 of the back side base member 33. Thus, attachment workability is improved.

The back side base member 33 and the front side base member 50 may be fixed using the plurality of coupling members 60. In this case, the plurality of coupling members 60 is desirably inserted into the insertion openings 57 in the centers of the plurality of concave portions 56 formed near both the right and left ends on the front side of the combining portion 52, and provided at different positions from the convex portion 55 formed in a center of the combining portion 52.

In such a way, by fixing the vicinities of both the right and left ends of the combining portion 52 by the plurality of coupling members 60, rigidity of the convex portion 55 in a center part of the combining portion 52 is improved.

By fixing the reinforcing member 80, described later, to the convex portion 55, rigidity of a support part of the reinforcing member 80 is further improved.

The front side base member 50 is not only fixed to the back side base member 33 by the coupling members 60, but also may be welded and fixed thereto in a fitting surface overlapped with the front side of the back side base member 33. In this way, the fixing strength of the front side base member 50 and the back side base member 33 is improved.

The reinforcing member 80 is formed by a substantially reversed flask shape body made by curving a hollow or solid linear member, and, as shown in FIG. 3, welded and fixed in the up and down direction along a front side of the convex portion 55 of the front side base member 50. A wire is used as the linear member forming the reinforcing member 80 in order to reduce weight.

In place of the wire used as the linear member, a resin linear body may be used.

The reinforcing member 80 includes a pair of attachment portions 81, a pair of projection portions 82, and a combining portion 83. The attachment portions 81 are arranged in the up and down direction along the front side of the convex portion 55 and extend to a substantial upper end of the convex portion 55. The projection portions 82 continue from upper ends of the attachment portions 81 and incline and protrude to the right and left outer sides, and both right and left ends thereof extend upward. The combining portion 83 combines upper ends of the projection portions 82 substantially horizontally.

The width between the projection portions 82 is formed to be larger than the width between the attachment portions 81.

Side surfaces of the attachment portions 81 are welded and fixed in the up and down direction along the front side of the convex portion 55 and also extend around a sloping surface inclined to descend on the lower side of the front side of the convex portion 55 to be fixed. Lower ends of the attachment portions 81 are abutted with a center lower part of the front side of the combining portion 52 to be welded and fixed. Therefore, rigidity of the attachment portions 81 of the reinforcing member 80 is further improved, and a space of the front side base member 50 can effectively be utilized.

The projection portions 82 are formed to protrude to the right and left outer sides of the coupling members 60. Therefore, while ensuring rigidity of the entire headrest frame 31, its shape can be compact, so that the weight can further be reduced.

In the present embodiment, since the reinforcing member 80 is directly welded and fixed to the front side of the front side base member 50, there is an advantage that attachment is easily performed. However, with separately using a welding bracket having a substantially U-shape section or the like, when the reinforcing member 80 is held between the front side base member 50 and this welding bracket or the like and then welded and fixed, the fixing strength can further be improved.

Concave portions recessed for attaching the reinforcing member 80 may be provided along the up and down direction in the front side of the front side base member 50. By inserting the attachment portions 81 into the concave portions and welding and fixing, a fixing property is improved and the attachment workability is also improved.

In this way, in the present embodiment, only providing the reinforcing member 80 achieves an effect that the weight of the entire headrest 30 can easily be reduced without increasing size of the back side base member 33 and the front side base member 50 serving as the base part of the headrest frame 31.

Although the attachment portions 81 extend in the up and down direction along the front side of the convex portion 55 in the present embodiment, the present invention is not limited to this, but at least part of the attachment portions 81 may be curved or bent in the right and left direction. With such a shape, a contact area of the attachment portions 81 and the convex portion 55 is increased so that the fixing strength is improved. Thus, support rigidity of the reinforcing member 80 is further improved.

Although the projection portions 82 incline and protrude to the right and left outer sides from the upper ends of the attachment portions 81, the present invention is not limited to this but the projection portions may protrude substantially orthogonally to the right and left sides. With such a shape, height of the projection portions 82 can be reduced so that the shape can be compact.

Height of upper ends of the projection portions 82 on both the right and left sides may appropriately be adjusted. When the height is reduced, the shape can be compact. When the height is increased, the rigidity of the headrest 30 in the up and down direction can be improved.

Although the combining portion 83 couples the upper ends of the projection portions 82 substantially horizontally, the present invention is not limited to this, but at least part of the combining portion 83 may be curved or bent in the up and down direction. With such a shape, a support area of the combining portion 83 is increased, so that the rigidity of the headrest 30 is further improved.

Although the reinforcing member 80 includes the pair of attachment portions 81, the pair of projection portions 82, and the combining portion 83, the present invention is not limited to this, but the reinforcing member may include the pair of attachment portions 81 and an annular portion. The attachment portions 81 are arranged in the up and down direction along the front side of the convex portion 55 and extend to the substantial upper end of the convex portion 55. The annular portion continues from the upper ends of the attachment portions 81 and is curved in an annular shape to the right and left outer sides.

Figure 5:
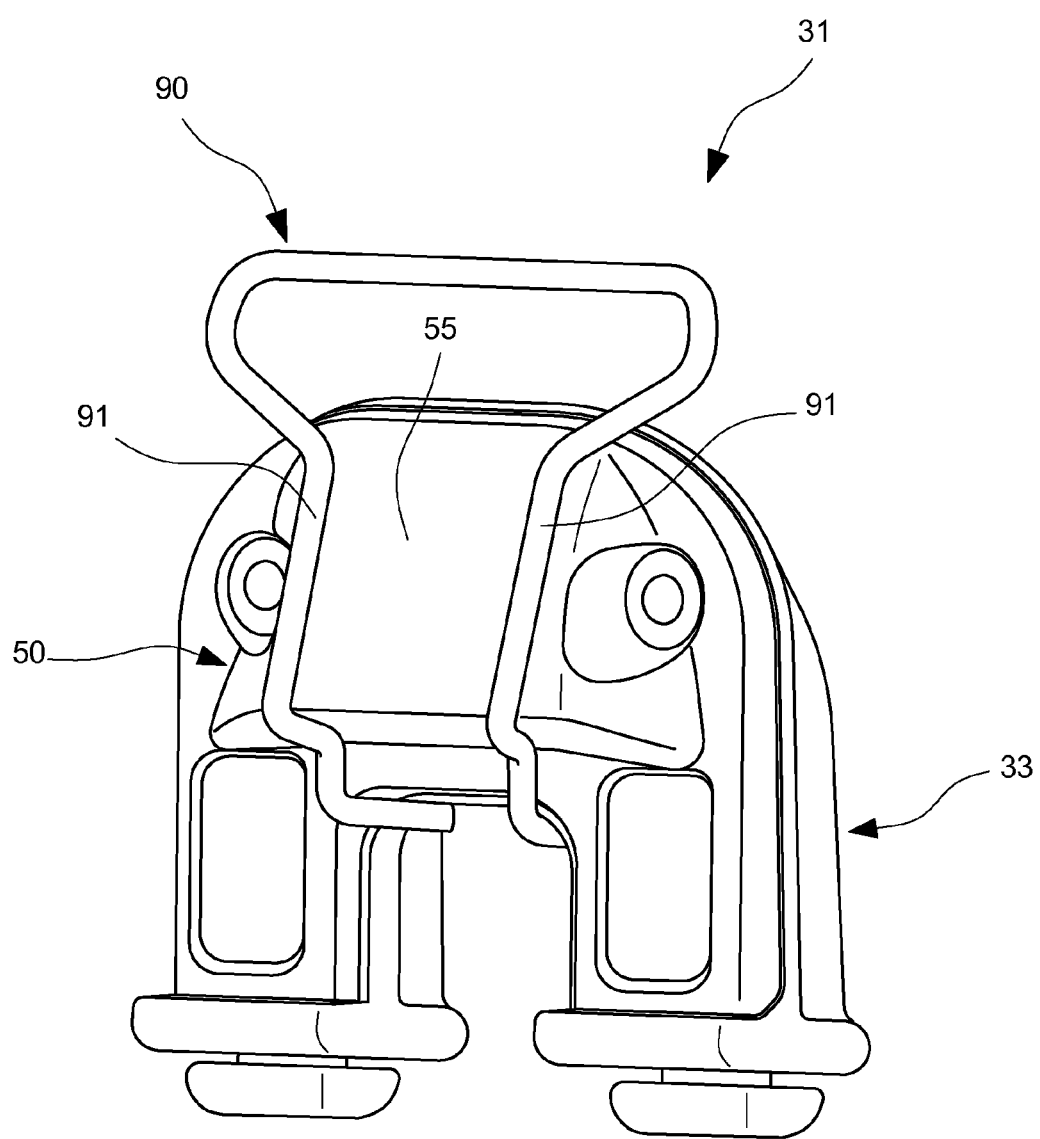
FIG. 5 is a front perspective view showing the headrest frame according to a second embodiment of the present invention.

FIG. 5 is a perspective view showing the headrest frame 31 according to a second embodiment of the present invention.

Side surfaces of attachment portions 91 of a reinforcing member 90 are welded and fixed in the up and down direction along the front side of the convex portion 55 of the front side base member 50, extend through the sloping surface inclined to descend on the lower side of the front side of the convex portion 55, and extend around a center bottom surface of the back side base member 33 to be welded and fixed.

Since the attachment portions 91 extend from the front side of the front side base member 50 to the bottom surface of the back side base member 33 to be welded and fixed, support rigidity of the reinforcing member 90 is further improved, and the attachment portions 91 suitable for shapes of the back side base member 33 and the front side base member 50 can be formed.

Insertion openings may separately be provided in the center bottom surface of the back side base member 33, and lower ends of the attachment portions 91 may be inserted into the insertion openings. Since the lower ends of the attachment portions 91 are inserted into the insertion openings and fitted into the back side base member 33, fixing strength of the attachment portions 91 and the back side base member 33 is further improved.

Figure 6:
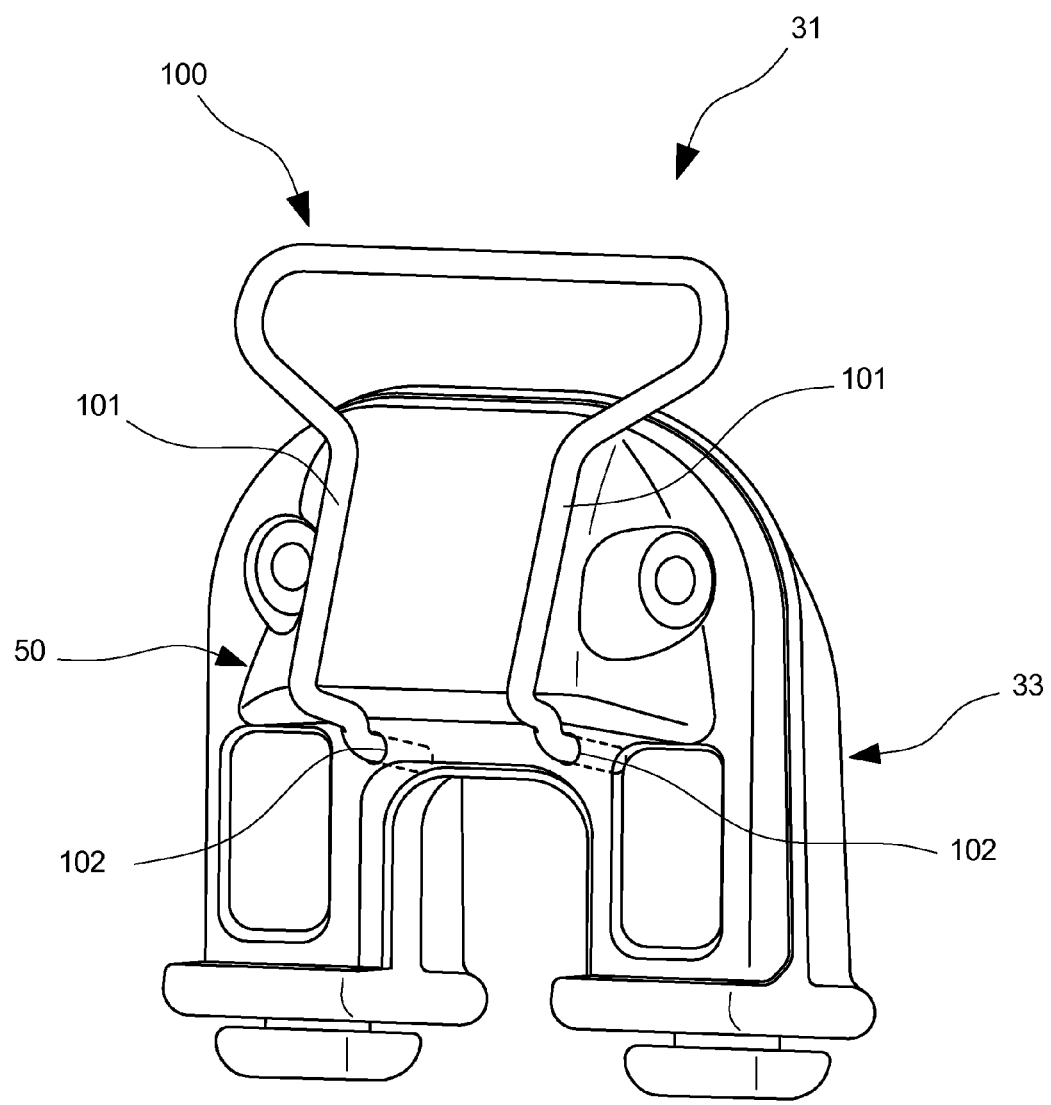
FIG. 6 is a front perspective view showing the headrest frame according to a third embodiment of the present invention.
Figure 7:
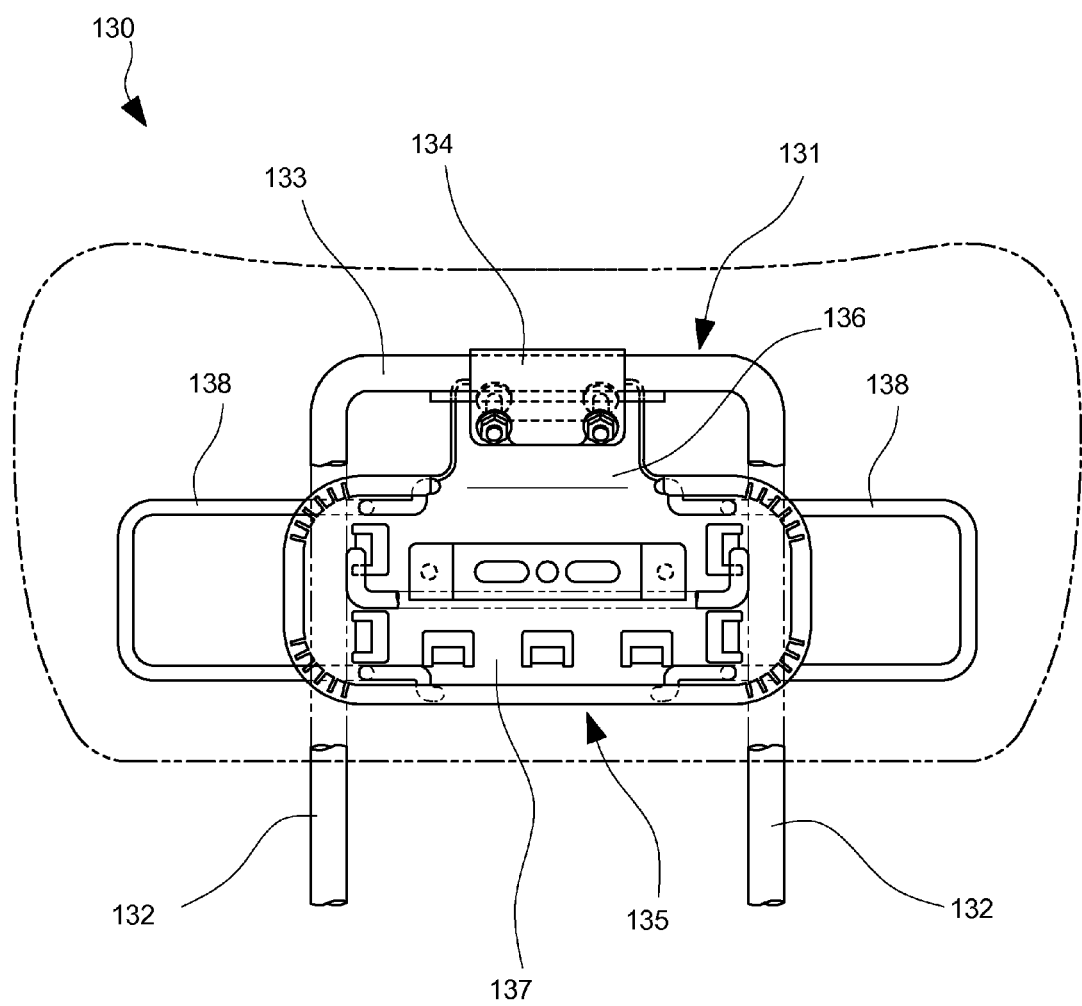
FIG. 7 is a front illustrative view of a headrest showing an example of the related art.

FIG. 6 is a perspective view showing the headrest frame 31 according to a third embodiment of the present invention.

Lower ends of attachment portions 101 of a reinforcing member 100 are inserted into insertion openings 102 provided in a center lower part of the front side of the front side base member 50 and abutted with the front side of the back side base member 33 to be welded and fixed.

Since the attachment portions 101 are fixed to the back side base member 33 and the front side base member 50, support rigidity of the reinforcing member 100 is further improved, and fixing strength of the reinforcing member 100, the back side base member 33 and the front side base member 50 is further improved.

Attachment bosses may separately be provided in parts with which the lower ends of the attachment portions 101 are abutted in the front side of the back side base member 33. The lower ends of the attachment portions 101 are fitted and fixed into the attachment bosses, thus the fixing strength is further improved.

In addition to the headrest shown in the above embodiments, a headrest may be formed by fixing the reinforcing member according to the above embodiments to a known headrest frame provided with stays.

This headrest frame is provided with the stays extending downward, and upper ends of the stays are coupled by a coupling portion to be formed in a substantially reversed squared U-shape. A substantially rectangular plate member is coupled to a center in the right and left direction of this coupling portion via a rotation portion. This plate member has an oscillation plate portion fixed to the rotation portion and a plate main body portion. The reinforcing member according to the above embodiments is welded and fixed to a center of a front side of this plate main body portion along the up and down direction.

This headrest is installed in a seat back by inserting the stays into hollow stay insertion portions provided in an upper part of the seat back.

The reinforcing member according to the above embodiments may directly be welded and fixed to a substantially reversed squared U-shape headrest frame including stays and stay coupling portions to form a headrest. Regarding a fixing position of the reinforcing member and the headrest frame, the reinforcing member may be welded and fixed to the stays extending in the up and down direction or may be orthogonally welded and fixed to the stay coupling portions extending in the right and left direction.

Further, although the headrest is pivotable by the headrest pivot mechanism 24 from a standing state on the upper side of the seat back 20 to a forward-folded state in the above embodiments, the present invention is not limited to this. For example, the headrest may be integrated with a seat back which has no pivot mechanism.

In the above embodiments, the headrest of the vehicle seat and the vehicle seat provided with the headrest according to these embodiments of the present invention are mainly described.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A headrest of a vehicle seat, comprising:
    a base member supporting stay guides, defining an up-to-down direction in a direction of receiving stays, the base member thus attached to an upper part of a seat back; and a reinforcing member attached to the base member;
wherein:
- the base member is formed by coupling a front side base member and a back side base member;
- the reinforcing member includes:
  - attachment portions fixed on an outer surface of the base member and extending in the up-to-down direction; and
  - projection portions continuing from the attachment portions, extending and inclining upward and toward right and left outer sides, and protruding to the upper side of the base member; and
- the projection portions have larger width therebetween than that of the attachment portions.

2. The headrest of the vehicle seat according to claim 1, wherein:
- the base member includes a coupling member for coupling the front side base member and the back side base member; and
- the reinforcing member is attached to a front side of the front side base member at a different position from the coupling member.

3. The headrest of the vehicle seat according to claim 2, wherein:
- a plurality of the coupling members are provided; and
- the different position from the coupling members is a region placed between the plurality of the coupling members.

4. The headrest of the vehicle seat according to claim 3, wherein:
- the region of the front side base member placed between the plurality of the coupling members is formed as a protruding convex portion; and
- the attachment portions are fixed to the convex portion.

5. The headrest of the vehicle seat according to claim 4, wherein:
- the attachment portions extend in an up and down direction along the convex portion; and
- lower ends of the attachment portions extend around a lower side of the convex portion.

6. The headrest of the vehicle seat according to claim 1, wherein:
- the base member is formed in a reversed U-shape in which upper parts of a pair of leg portions are coupled; and
- lower ends of the attachment portions are arranged on extended surfaces of side surfaces of the pair of leg portions.

7. The headrest of the vehicle seat according to claim 1, wherein:
- the reinforcing member includes a linear member.

8. The headrest of the vehicle seat according to claim 1, wherein:
- a stay provided in the seat back is inserted into the base member; and
- the reinforcing member is arranged in at least a different region from a region where the stay is inserted in the base member.

9. The headrest of the vehicle seat according to claim 1, wherein:
- a width between upper parts of the projection portions and the attachment portions is largest in the projection portions.

10. A vehicle seat, comprising:
- the headrest according to claim 1.

11. The vehicle seat according to claim 10, wherein:
- a seat back and the headrest are foldable toward a front side.

* * * * *